United States Patent [11] 3,630,564

[72] Inventor Rudolph A. Ferrara
 Warren, Mich.
[21] Appl. No. 34,439
[22] Filed May 4, 1970
[45] Patented Dec. 28, 1971
[73] Assignee General Motors Corporation
 Detroit, Mich.

[54] VEHICLE BODY CONDUIT
 3 Claims, 4 Drawing Figs.
[52] U.S. Cl. .................................................. 296/1 R,
 174/68 C, 174/72 A
[51] Int. Cl. ............................................. H01b 17/58
[50] Field of Search ........................................ 296/1 R;
 280/422; 138/119, 118; 174/68 C, 72 A, 119

[56] References Cited
 UNITED STATES PATENTS
3,078,116 2/1963 West ............................ 296/1
3,534,777 10/1970 Loof ............................ 138/119 X
3,080,892 3/1963 Plummer ..................... 174/72 A X Primary Examiner—Leo Friaglia
Assistant Examiner—John A. Pekar
Attorneys—W. E. Finken and Herbert Furman ABSTRACT: An elongated conduit of a semirigid plastic for carrying electrical wires includes an elongated base and an elongated closure flap integrally connected to each other along respective elongated edges thereof. The base includes angularly disposed elongated walls respectively supported by angularly disposed walls of a rocker inner section of a vehicle floor pan assembly. Cooperating hooks on the flap and the base secure the flap in a closed position. The closed flap and the base jointly define an elongated cavity in which the wires are carried. The closed flap is normally concave with respect to the cavity transversely thereof but is flexibly movable outwardly thereof to increase the cross-sectional area of the cavity as required by the cross-sectional area of wires therein.

A modification includes an opening in the flap intermediate the ends of the conduit that allows regression of one or more wires from the cavity. The flap is flexed outwardly over the length of the conduit that carries the larger cross-sectional area of wires and is concave over the length of the conduit that carries the smaller cross-sectional area of wires.

PATENTED DEC 28 1971

3,630,564

INVENTOR.
Rudolph A. Ferrara
BY
Herbert Furman
ATTORNEY

VEHICLE BODY CONDUIT

This invention relates to vehicle bodies and more particularly to vehicle bodies that include conduits for carrying electrical wires.

It is well known for vehicle bodies to include conduits that extend along the left and/or right-hand rocker structures to carry electrical wires between the forward and rearward ends of the bodies. If each wire occupies the same position in each conduit, the assembler who connects the wires to their respective terminals can gain a familiarity with the position of egression of each wire from the ends of the conduits, thus facilitating ease of connection. It is therefore desirable that the wires be securely positioned within the conduits.

Quite often, vehicle bodies having both left and right-hand conduits will be designed such that one or the other of the conduits will carry a greater cross-sectional area of wires. Similarly, different models of vehicle bodies have different power requirements resulting in different cross-sectional areas of wires extending between the forward and rearward ends of the vehicle bodies. Also, due to the increasing use of power-actuated windows, the conduits require openings allowing egression of a number of wires intermediate the ends of the conduits. This necessarily results in the conduits carrying different cross-sectional areas of wires over intervals of the lengths thereof.

This invention provides a conduit which securely positions different cross-sectional areas of wires therein. The conduit also securely positions different cross-sectional areas of wires over intervals of the length thereof.

An object of this invention is to provide a vehicle body conduit which securely positions different cross-sectional areas of wires therein.

Another object of this invention is to provide a vehicle body conduit which securely positions different cross-sectional areas of wires over intervals of the length thereof.

In carrying out these objects, the conduit includes a base and a flap integrally connected to the base for movement to a closed position to jointly define a cavity with the base. The flap is normally concave with respect to the cavity and engages the wires to securely position the wires between the base and the flap. The flap is flexibly movable outwardly of the cavity to engage and securely position a greater cross-sectional area of wires between the base and the flap. The conduit thus securely positions wires in predetermined positions therein and thus maintains the egression of the wires from the ends of the conduit in predetermined positions therefrom.

Figure 1:
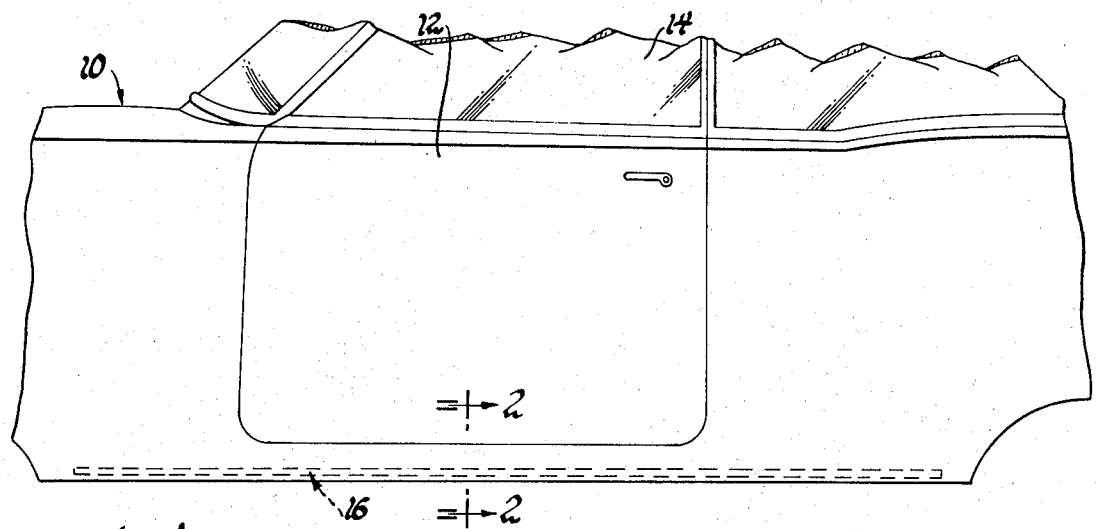
FIG. 1 is a partial side elevational view of a vehicle body including a conduit according to the invention.

Referring to FIG. 1, a vehicle body generally indicated at 10 includes a front door 12 that conventionally slidably mounts a front window 14. An elongated conduit 16, according to one embodiment of the invention, extends between the forward and rearward ends of the body 10 along the left-hand side thereof.

Figure 2:
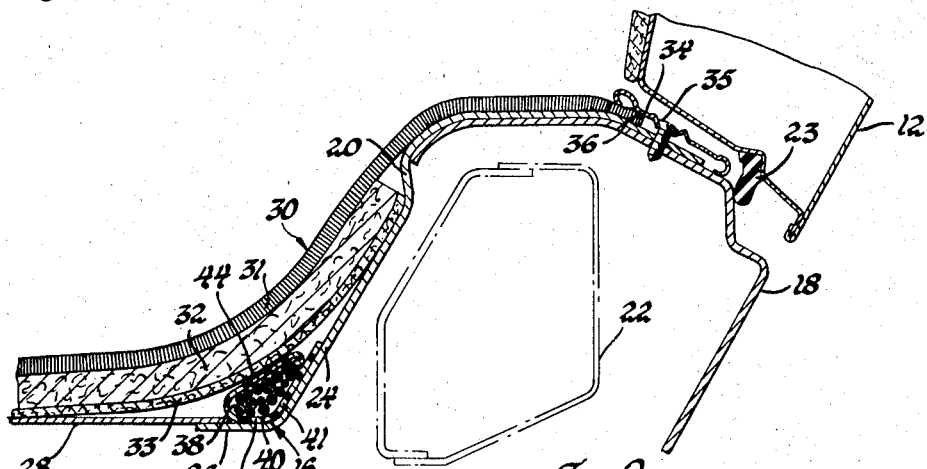
FIG. 2 is an enlarged sectional view taken along line 2—2 of FIG. 1.

Referring more particularly to FIG. 2, a rocker outer section 18 is conventionally welded to a rocker inner section 20 in a relationship adapted to receive a phantom line indicated frame member 22 therebetween. A conventional weatherstrip 23 carried by door 12 seals against the rocker outer section 18 in the door-closed position. The inboard edge portion of the rocker inner section 20 includes angularly disposed walls 24 and 26. A conventional floor pan 28 is welded to the wall 26 and a covering generally indicated by 30 extends between the rocker inner section 20 and the floor pan 29. The covering 30 includes a carpet 31, a padding 32, and a padding underlay 33. A conventional sill plate 34 is secured to sections 18 and 20 by screws 35 and anchors an outboard edge portion 36 of carpet 31. Situated between the padding underlay 33 and the rocker inner section 20 is the conduit 16 which carries wires 38 between the forward and rearward ends of the body 10.

Figure 3:
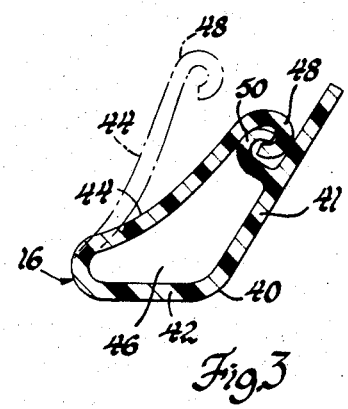
FIG. 3 is an enlarged sectional view of the conduit.

Referring to FIG. 3, the conduit 16 is formed of semirigid plastic material either by extrusion or molding and includes an elongated base section 40 that has angularly disposed elongated walls 41 and 42. The walls 41 and 42 are respectively supported by walls 24 and 26 of rocker inner section 20 as in FIG. 2. The base 40 may be secured to the section 20 by adhesives or conventional fastening means or the covering 30 may position the conduit 16 as shown. An elongated closure flap 44 is integrally connected to wall 42 along respective inboard elongated edges thereof. As shown in FIG. 3, the flap 44 is generally movable between a phantom line open position and a solid line closed position in which the base 40 and the flap 44 jointly define an elongated cavity 46. When the flap 44 is in the open position, the wires 38 can be inserted within the conduit 16 between the base 40 and the flap 44. Cooperating elongated hooks 48 and 50 secure the flap 44 to base 40 in closed position with the wires 38 within cavity 46. As shown in FIG. 3, the flap 44 is concave transversely with respect to the cavity 46. Since flap 44 is flexible, it can be moved outwardly of the cavity 46 from its FIG. 3 position to the position shown in FIG. 2 to increase the normal cross-sectional area of the cavity 46 and allow the conduit 16 to carry an increased cross-sectional area of wires. While it is not shown in the drawings, the flap 44 may also flex outwardly to a position convex with respect to the cavity to further increase the cross-sectional area of the cavity.

In closed position, the concave flap 44 engages and securely positions wires between the base 40 and the flap 44. In closed position, the outwardly flexed flap 44 engages and securely positions a greater cross-sectional area of wires between the base 40 and the flap 44. The conduit 16 thus securely positions different cross-sectional areas of wires therein and maintains the egression of the wires from the ends of the conduits in predetermined positions.

Figure 4:
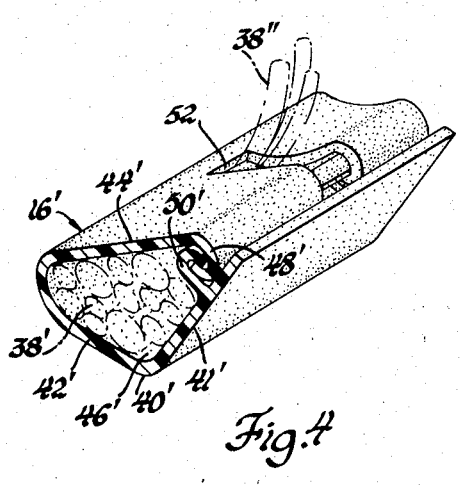
FIG. 4 is a perspective view of another embodiment of the conduit.

FIG. 4 shows another embodiment of a conduit according to the invention wherein the corresponding parts are indicated by corresponding primed numerals. In this embodiment, the closure flap 44' includes an opening 52 intermediate the ends of the conduit 16'. The opening 52 allows egression of wires 38" which may supply power to electric motors controlling the movement of the window 14 or to other electrical devices intermediate the forward and rearward ends of the vehicle body 10. In this embodiment, the flap 44' will be flexed outwardly of cavity 46', as shown in FIG. 2, over the interval of the length of the conduit 16' carrying the greater cross-sectional area of wires and will be concave of cavity 46', as shown in FIG. 3, over the interval of the length of the conduit 16' carrying the smaller cross-sectional area of wires. The base 40' and the flap 44' are thus in engagement with the respective wires adjacent thereto. The conduit 16' is thus capable of securely positioning different cross-sectional areas of wires over the intervals of the length thereof to maintain the egression of the wires from the ends of the conduits in predetermined positions.

What is claimed is:

1. The combination comprising, a vehicle body including a support member, an integral elongated conduit of semirigid plastic including an elongated base portion supported by the support member, an elongated closure portion including an elongated edge integrally connected to an elongated edge of the base portion, the closure portion being movable between an open position permitting introduction of electrical wires into the conduit and a closed position jointly defining an elongated cavity with the base portion, one of the portions being concave with respect to the cavity transversely thereof and flexibly movable outwardly thereof to increase the cross-sectional area of the cavity, and means securing the closure portion to the base portion in the closed position.

2. The combination comprising, a vehicle body including a support member having angularly disposed support walls, an integral elongated conduit of semirigid plastic including an elongated base having angularly disposed elongated base walls each of which is supported by a respective support wall, an elongated closure flap including an elongated edge integrally connected to an elongated edge of the base, the flap being movable between an open position permitting introduction of electrical wires into the conduit and a closed position jointly defining an elongated cavity with the base, the flap being concave with respect to the cavity transversely thereof and flexibly movable outwardly thereof to increase the cross-sectional area of the cavity, and cooperating means on the flap and the base securing the flap to the base in the closed position.

3. The combination comprising, a vehicle body including a support member, an integral elongated conduit of semirigid plastic including an elongated base portion supported by the support member, an elongated closure portion including an elongated edge integrally connected to an elongated edge of the base portion, the closure portion being movable between an open position permitting introduction of electrical wires into the conduit and a closed position jointly defining an elongated cavity with the base portion, the closure portion having an opening intermediate the ends of the conduit communicating the cavity and the environment adjacent the closure portion and allowing egression of wires from the cavity, one of the portions being concave with respect to the cavity transversely thereof and flexibly movable outwardly thereof to increase the cross-sectional area of the cavity, and means securing the closure portion to the base portion in the closed position.

* * * * *